United States Patent
Lee

(10) Patent No.: US 7,656,289 B2
(45) Date of Patent: Feb. 2, 2010

(54) APPARATUS FOR MONITORING AN INSIDE OF A MANHOLE

(75) Inventor: Su-kil Lee, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 561 days.

(21) Appl. No.: 11/651,970

(22) Filed: Jan. 11, 2007

(65) Prior Publication Data
US 2007/0159320 A1    Jul. 12, 2007

(30) Foreign Application Priority Data
Jan. 11, 2006 (KR) .................. 10-2006-0002988

(51) Int. Cl.
*H04Q 1/30* (2006.01)
*H04M 11/04* (2006.01)

(52) U.S. Cl. .............. 340/538.15; 340/854.8; 340/853.2; 340/538.11

(58) Field of Classification Search ........... 340/538.15, 340/853.2, 854.8
See application file for complete search history.

(56) References Cited

U.S. PATENT DOCUMENTS

| | | | | |
|---|---|---|---|---|
| 4,806,928 A | * | 2/1989 | Veneruso | 340/853.3 |
| 5,008,664 A | * | 4/1991 | More et al. | 340/854.8 |
| 6,459,383 B1 | * | 10/2002 | Delatorre | 340/854.9 |

FOREIGN PATENT DOCUMENTS

| | | |
|---|---|---|
| KR | 10-2004-0055907 | 6/2004 |
| KR | 10-2006-0001991 | 1/2006 |

* cited by examiner

*Primary Examiner*—Donnie L Crosland
(74) *Attorney, Agent, or Firm*—McDermott Will & Emery LLP

(57) ABSTRACT

An apparatus for monitoring an inside of a manhole in which the inside of the manhole is monitored using a simple communication and power supply unit is closed. The apparatus comprises power cables installed inside a manhole, a connecting unit connecting the corresponding power cables, a monitoring communication control unit colleting maintenance information about the corresponding power cables and performing signal processing of the maintenance information, a power supply unit supplying power directly from the power cable or the connecting unit to the monitoring communication control unit, a signal injection unit digitalizing the maintenance information collected by the monitoring communication control unit and injecting the digitalized information into the power cable to transmit the maintenance information to a next manhole, and a signal receiver installed in the power cable or the connecting unit and receiving maintenance information transmitted via the power cable to input the received maintenance information to the monitoring communication control unit. Accordingly, a device and a communication line need not to be installed outside the manhole and a power line need not to be drawn out from the outskirts of a city and the inside of the manhole can be simply and conveniently monitored.

3 Claims, 2 Drawing Sheets

APPARATUS FOR MONITORING AN INSIDE OF A MANHOLE

CROSS-REFERENCE TO RELATED PATENT APPLICATIONS

This application claims the benefit of Korean Patent Application No. 10-2006-0002988, filed on Jan. 11, 2006, in the Korean Intellectual Property Office, the disclosure of which incorporated herein in its entirety by reference.

BACKGROUND OF THE INVENTION

1. Field of the Invention

The present invention relates to an apparatus for monitoring an inside of a manhole, and more particularly, to an apparatus for monitoring an inside of a manhole in which the inside of the manhole is monitored using a simple communication and power supply unit.

2. Description of the Related Art

A conventional apparatus for monitoring an inside of a manhole includes power cables 12-1 and 12-2 which are underground transmission lines installed inside a manhole 11, a connecting unit 13 for connecting the two corresponding power cables 12-1 and 12-2 to each other if necessary, and two covers 14 and 15 for closing a ground opening 11-1 of the manhole 11, as illustrated in FIG. 1. The apparatus for monitoring an inside of a manhole further includes a sensor 16 for collecting maintenance information about the corresponding power cables 12-1 and 12-2, a circuit unit 17 for processing a signal of the maintenance information collected by the corresponding sensor 16, a predetermined small power type wireless transmitter 18 prescribed by the Propagation Law, a transmission antenna 18-1 for transmitting a wireless signal of the corresponding wireless transmitter 18, a reception relay antenna 21 installed on a bottom surface of the second cover 15 and receiving a wireless signal of the corresponding wireless transmitter 18, an impedance matching circuit unit 22 which is installed on a top surface of the second cover 15, whose input terminal being connected to the corresponding reception relay antenna 21 and which impedance-matches the corresponding reception relay antenna 21 and the corresponding first cover 14, and an electrode 23 connected to an output terminal of the impedance matching circuit unit 22.

An outer diameter of the first and second covers 14 and 15 is about 700-900 mm, respectively. The covers 14 and 15 have a double cover structure comprising the outer first cover 14 and the inner second cover 15 for preventing submerge. A distance between the first cover 14 and the second cover 15 is generally 200-300 mm.

A plurality of sensors 16 are installed in the manhole 11 so as to measure several physical values which will be used as maintenance information in the manhole 11. Here, only one sensor 16 is illustrated.

The circuit unit 17 and the wireless transmitter 18 are fixed on an inner wall 11-2 of the manhole 11. The transmission antenna 18-1 may be the most common rod antenna.

The reception relay antenna 21 may be configured in a general die pole shape. A direction of the reception relay antenna 21 is parallel to the transmission antenna 18-1 of the wireless transmitter 18.

The electrode 23 has a surface area having a proper size so as to form an electrostatic capacity between the electrode 23 and the first cover 14 and may be formed of copper or copper alloy of brass etc., for example.

An operation of the conventional apparatus for monitoring an inside of a manhole having the above structure will now be briefly described.

First, the maintenance information collected by the sensor 16 is transmitted to the wireless transmitter 18 via the circuit unit 17 and is sent as a wireless signal by the corresponding wireless transmitter 18 via the transmission antenna 18-1.

At this time, since a wireless signal cannot be radiated to an outside of the manhole 11 only via the wireless transmitter 18, transmission power of the corresponding wireless signal is extracted by the reception relay antenna 21 installed on a bottom surface of the second cover 15 of the corresponding manhole 11 and maximum power is rapidly supplied to the corresponding first cover 14 through an electrostatic capacity between the electrode 23 connected to the corresponding impedance matching circuit unit 22 and the bottom surface of the first cover 14 of the corresponding manhole 11.

As such, the first cover 14 serves as an antenna. Thus, the wireless signal is radiated to the outside via the first cover 14. The corresponding wireless signal is received by a ground wireless receiver 20 so that circumstances in the manhole 11 can be recognized. At this time, the corresponding wireless receiver 20 may be installed on the ground or may be held by a person in charge of maintenance.

However, in the conventional apparatus for monitoring an inside of a manhole described above, a unit for connecting a signal with an outside of the manhole for wireless communication is needed, a data transceiver is also needed outside the manhole and a special supply source for supplying power required for an apparatus is also needed. Thus, a power line should be drawn out from the outskirts of a city and a structure of the apparatus is complicated and reproducibility is lowered.

SUMMARY OF THE INVENTION

The present invention provides an apparatus for monitoring an inside of a manhole in which the inside of the manhole is monitored using a simple communication and power supply unit.

The present invention also provides an apparatus for monitoring an inside of a manhole in which the inside of the manhole is monitored using a simple communication and power supply unit so that the use of the apparatus need not to be used outside the manhole, a communication line need not to be installed and a power line need not to be drawn out from the outskirts of a city.

According to an aspect of the present invention, there is provided an apparatus for monitoring an inside of a manhole, the apparatus comprising: power cables installed inside a manhole; a connecting unit connecting the corresponding power cables; a monitoring communication control unit colleting maintenance information about the corresponding power cables and performing signal processing of the maintenance information; a power supply unit supplying power directly from the power cable or the connecting unit to the monitoring communication control unit; a signal injection unit digitalizing the maintenance information collected by the monitoring communication control unit and injecting the digitalized information into the power cable to transmit the maintenance information to a next manhole; and a signal receiver installed in the power cable or the connecting unit and receiving maintenance information transmitted via the power cable to input the received maintenance information to the monitoring communication control unit.

The power supply unit may comprise a current transformer (CT) mounted in the power cable or the connecting unit and obtaining a voltage directly from the power cable, and a rectifier rectifying the voltage obtained by the CT and supplying the rectified voltage as power to the monitoring communication control unit.

The signal injection unit may convert the maintenance information generated by the monitoring communication control unit and may inject the converted maintenance information into the power cable via the connecting unit to transmit the maintenance information to a next manhole along the power cable.

According to the present invention, the information generated in the monitoring communication control unit is digitalized so that a corresponding signal can be transmitted to a next manhole along a power cable through a PLC signal injector, power used in the monitoring communication control unit is not drawn out from the outside of the manhole but a voltage obtained from the CT mounted in the power cable is rectified by a rectifier, data transmitted from another manhole at a short distance is received from a signal receiver attached to the cable and then to repeatedly transmit the received data to another manhole, the data is input to a corresponding PLC signal injector via the corresponding monitoring communication control unit such that a device and a communication line need not to be installed outside the manhole and a power line need not to be drawn out from the outskirts of a city and the inside of the manhole is simply and conveniently monitored.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF THE INVENTION

An exemplary embodiment of the present invention will now be described in greater detail with reference to the accompanying drawings.

Figure 1:
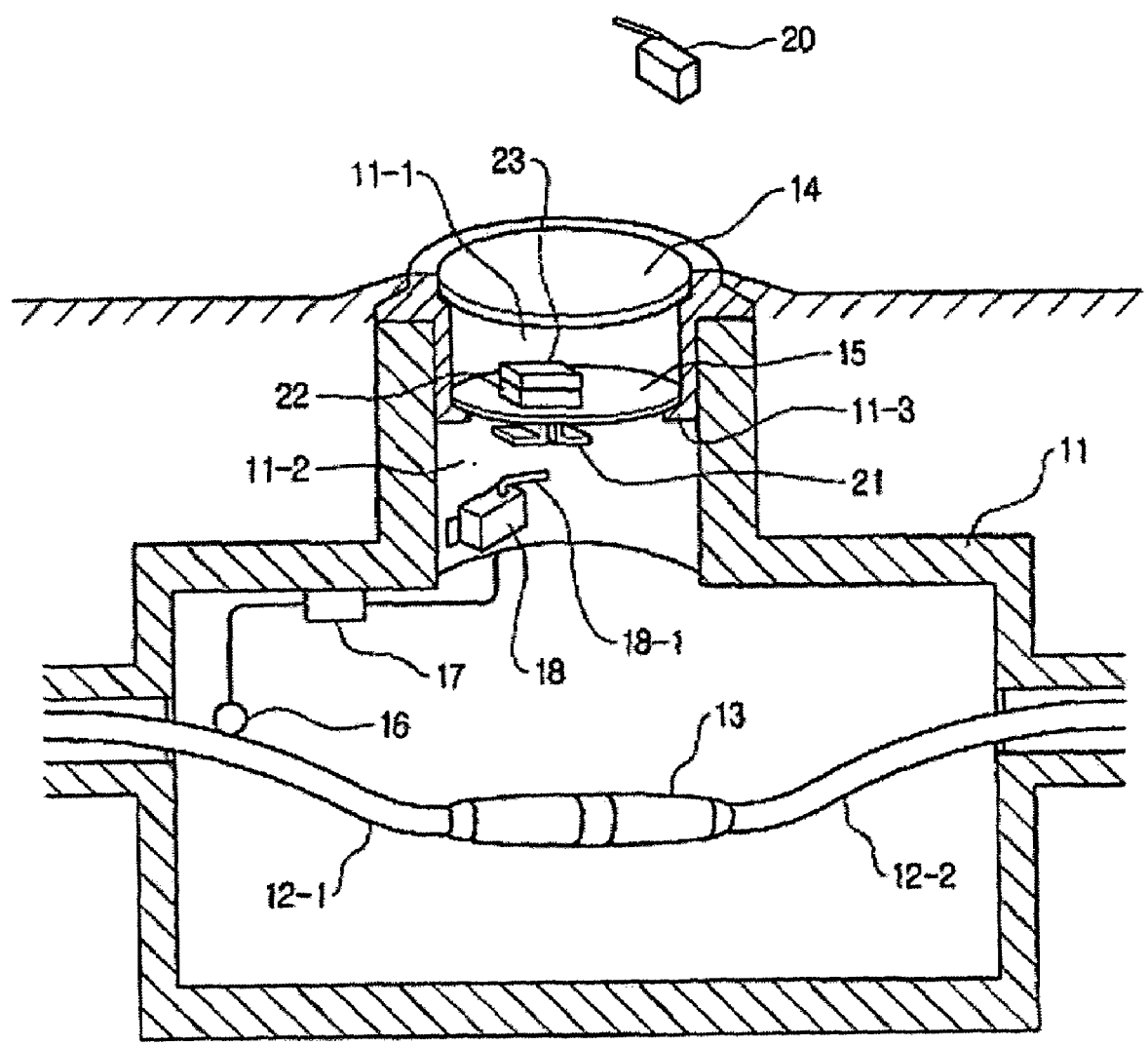
FIG. 1 illustrates a structure of a conventional apparatus for monitoring an inside of a manhole.
Figure 2:
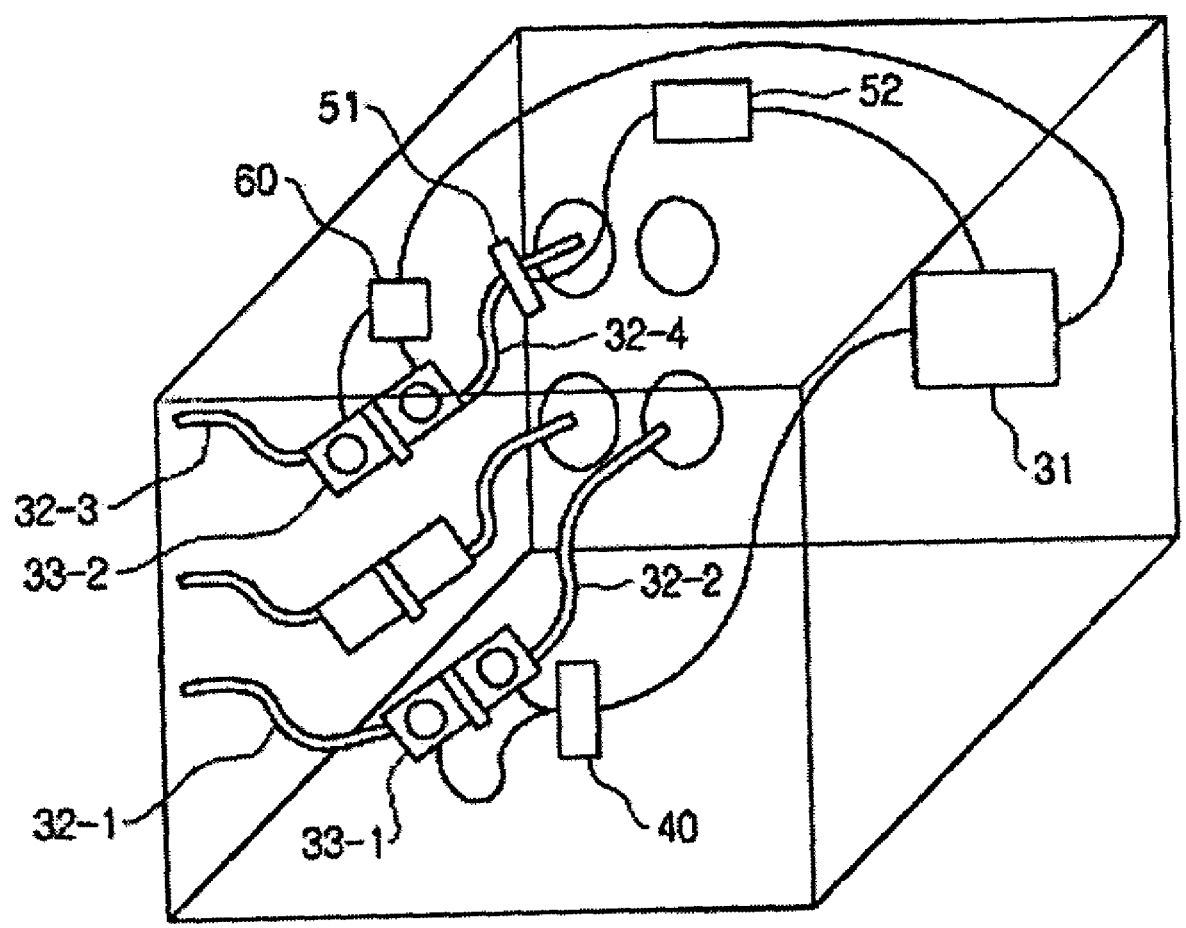
FIG. 2 illustrates a structure of an apparatus for monitoring an inside of a manhole according to an embodiment of the present invention.

FIG. 2 illustrates a structure of an apparatus for monitoring an inside of a manhole according to an embodiment of the present invention.

Referring to FIG. 2, the apparatus for monitoring an inside of a manhole includes a monitoring communication control unit 31, power cables 32-1 to 32-4, connecting units 33-1 and 33-2, a signal injection unit 40, power supply units 51 and 52, and a signal receiver 60.

The monitoring communication control unit 31 performs an operation by power supplied from the power supply units 51 and 52, receives maintenance information about another manhole from the signal receiver 60 or collects maintenance information about each of the power cables 32-1 to 32-4, processes a signal about the received or collected maintenance information and transmits the processed signal to the signal injection unit 40.

The power cables 32-1 to 32-4 are underground transmission lines and are installed inside the manhole.

The connecting units 33-1 and 33-2 connect the power cables 32-1 to 32-4 to each other if necessary. That is, the first connecting unit 33-1 connects the first power cable 32-1 to the second power cable 32-2 and the second connecting unit 33-2 connects the third power cable 32-3 to the fourth power cable 32-4.

The signal injection unit 40 digitalizes the maintenance information applied from the monitoring communication control unit 31 and injects the digitalized maintenance information into the power cables 32-1 and 32-2 to transmit the injected information to a next manhole. In particular, the signal injection unit 40 is a power line communication (PLC) signal injector and digitalizes the maintenance information collected and generated by the monitoring communication control unit 31 and converts the maintenance information into a PLC signal, injects the converted PLC signal into the power cables 32-1 and 32-2 via the first connecting unit 33-1 to transmit the injected PLC signal to a next manhole along the power cables 32-1 and 32-2.

The power supply units 51 and 52 do not draw out power used in the monitoring communication control unit 31 from the outside of the manhole but obtains power used in the monitoring communication control unit 31 directly from the fourth power cable 32-4 and supplies to the monitoring communication control unit 31. In particular, the power supply units 51 and 52 include a current transformer (CT) mounted in the fourth power cable 324 and obtaining a voltage directly from the fourth power cable 32-4, and a rectifier rectifying the voltage obtained by the corresponding CT 51 and supplying the rectified voltage as power required for the monitoring communication control unit 31.

The signal receiver 60 is connected to the power cable 32-3 and 32-4 or the second connecting unit 33-2. The signal receiver 60 inputs maintenance information to the monitoring communication control unit 31 so as to receive data transmitted via the power cables 32-3 and 32-4 from a signal injection unit (not shown for explanatory convenience) installed inside another manhole and then to repeatedly transmit to another manhole. In particular, the signal receiver 60 receives maintenance information transmitted from another manhole at a short distance and then inputs the received maintenance information to the monitoring communication control unit 31 and repeatedly transmits the maintenance information to a next manhole.

An operation of the apparatus for monitoring an inside of a manhole according to an embodiment of the present invention will now be described.

First, like in the prior art, power used in the monitoring communication control unit 31 is not drawn out from an outside of a manhole but is supplied to the corresponding monitoring communication control unit 31 directly from the power supply units 51 and 52.

That is, the power supply units 51 and 52 are mounted in a power cable which is a arbitrary underground transmission line installed inside the manhole, that is, in the fourth power cable 32-4 illustrated in FIG. 2, and supplies power to the monitoring communication control unit 31 directly from the fourth power cable 32-4.

More specifically, the power supply units 51 and 52 include the CT 51 and the rectifier 52. The corresponding CT 51 applies power directly from the fourth power cable 32-4 to the corresponding rectifier 52. The corresponding rectifier 52 rectifies a voltage applied from the corresponding CT 51 and supplies the rectified voltage to the monitoring communication control unit 31.

As such, the monitoring communication control unit 31 operates by power supplied from the power supply units 51 and 52. At this time, the monitoring communication control unit 31 collects maintenance information about each of the power cables 32-1 to 32-4, performs signal processing about the collected maintenance information and then transmits the corresponding signal-processed maintenance information to the signal injection unit 40.

As such, the signal injection unit 40 digitalizes maintenance information applied from the monitoring communication control unit 31 and injects the digitalized maintenance information into one of the power cables 32-1 to 32-4 installed inside the manhole to transmit the injected information to a next manhole.

In particular, as illustrated in FIG. 2, the signal injection unit 40 is a power line communication (PLC) signal injector and transmits data related to maintenance information inside the manhole via a power line for supplying power by loading the data on a high frequency signal. That is, the signal injection unit 40 digitalizes the maintenance information collected and generated by the monitoring communication control unit 31 and converts the maintenance information into a PLC signal and then, if necessary, injects the converted PLC signal into the first power cable 32-1 and the second power cable 32-2 via the first connecting unit 33-1 for connecting the first power cable 32-1 and the second power cable 32-2 to each other or injects the converted PLC signal directly into the power cables 32-1 and 32-2, thereby transmitting the injected PLC signal to a next manhole along the power cables 32-1 and 32-2.

Then, a signal receiver (not shown for explanatory convenience) installed in a connecting unit (not shown for explanatory convenience) for connecting a power cable (not shown for explanatory convenience) which is an arbitrary underground transmission line installed inside the next manhole or two power cables, if necessary, receives a PLC signal transmitted via the power cables 32-1 and 32-2 from the signal injection unit 40.

At this time, an operation of receiving the PLC signal will now be described in greater detail with reference to FIG. 2.

As illustrated in FIG. 2, the signal receiver 60 that is connected to the second connecting unit 33-2 for connecting the power cable 32-3 and 32-4 or the third power cable 32-3 and the fourth power cable 32-4 receives a PLC signal (that is, maintenance information) transmitted at a short distance via the corresponding power cables 32-3 and 32-4 from a signal injection unit (not shown for explanatory convenience) installed inside another manhole and then processes the received PLC signal to input the processed PLC signal to the monitoring communication control unit 31, so as to repeatedly transmit the PLC signal to a next manhole.

As such, the monitoring communication control unit 31 receives maintenance information about another manhole from the signal receiver 60 and then performs signal processing of the maintenance information together with the received maintenance information, using the above-described operation to transmit the signal-processed maintenance information to the signal injection unit 40, thereby repeatedly transmitting the maintenance information received from another manhole by the signal injection unit 40 and the maintenance information collected from own manhole to a next manhole.

After that, maintenance information about each manhole can be finally checked by a signal receiver (not shown for explanatory convenience) provided inside a last manhole or a manhole desired by an operator (that is, a person in charge of manhole) and a monitoring communication control unit (not shown for explanatory convenience).

As described above, an inside of a manhole is monitored using a simple and convenient communication and power supply unit such that a device and a communication line need not to be installed outside the manhole and a power line need not to be drawn out from the outskirts of a city and the inside of the manhole is simply and conveniently monitored.

It should be well understood that the apparatus for monitoring an inside of a manhole which performs the above-described operation, is not limited to the above-described embodiment but partial discharge monitoring for a power cable, manhole level monitoring, manhole harmful gas monitoring, and circulation current monitoring pump actuating control etc.

While the present invention has been particularly shown and described with reference to an exemplary embodiment thereof, it will be understood by those skilled in the art that various changes in form and details may be made therein without departing from the spirit and scope of the invention as defined by the following claims.

What is claimed is:

1. An apparatus for monitoring an inside of a manhole, the apparatus comprising:
   power cables installed inside a manhole;
   a connecting unit connecting the corresponding power cables;
   a monitoring communication control unit colleting maintenance information about the corresponding power cables and performing signal processing of the maintenance information;
   a power supply unit supplying power directly from the power cable or the connecting unit to the monitoring communication control unit;
   a signal injection unit digitalizing the maintenance information collected by the monitoring communication control unit and injecting the digitalized information into the power cable to transmit the maintenance information to a next manhole; and
   a signal receiver installed in the power cable or the connecting unit and receiving maintenance information transmitted via the power cable to input the received maintenance information to the monitoring communication control unit.

2. The apparatus of claim 1, wherein the power supply unit comprising:
   a current transformer (CT) mounted in the power cable or the connecting unit and obtaining a voltage directly from the power cable; and
   a rectifier rectifying the voltage obtained by the CT and supplying the rectified voltage as power to the monitoring communication control unit.

3. The apparatus of claim 1, wherein the signal injection unit converts the maintenance information generated by the monitoring communication control unit and injects the converted maintenance information into the power cable via the connecting unit to transmit the maintenance information to a next manhole along the power cable.

* * * * *